(12) United States Patent
Kawakita et al.

(10) Patent No.: US 7,987,838 B2
(45) Date of Patent: Aug. 2, 2011

(54) CONTROLLER OF INTERNAL COMBUSTION ENGINE

(75) Inventors: Koji Kawakita, Ohbu (JP); Katsunori Ueda, Okazaki (JP); Toshiyuki Miyata, Okazaki (JP); Hiroki Yamamoto, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 345 days.

(21) Appl. No.: 12/370,681

(22) Filed: Feb. 13, 2009

(65) Prior Publication Data
US 2009/0205622 A1 Aug. 20, 2009

(30) Foreign Application Priority Data
Feb. 14, 2008 (JP) ................................ 2008-033812

(51) Int. Cl.
 *F02B 13/00* (2006.01)
 *F02B 13/02* (2006.01)
(52) U.S. Cl. ........................................ 123/575; 701/114
(58) Field of Classification Search .................. 123/575, 123/576, 577, 578, 516, 518, 519, 520, 672, 123/1 A; 701/103, 109, 114; 73/114.54
See application file for complete search history.

(56) References Cited

U.S. PATENT DOCUMENTS
6,975,933 B2 * 12/2005 Abe et al. ...................... 701/109

FOREIGN PATENT DOCUMENTS
JP 2004-251135 A 9/2004

* cited by examiner

*Primary Examiner* — Mahmoud Gimie
(74) *Attorney, Agent, or Firm* — Birch, Stewart, Kolasch & Birch, LLP (57) ABSTRACT

A controller of an internal combustion engine includes: a purge controller, operable to control a purge amount of the vaporized fuel purged to an air intake system; an exhaust air-fuel ratio detector; an air-fuel ratio feedback controller; a period determiner, operable to determine whether it is an estimation enabling period; and an alcohol concentration estimator, operable to estimate the alcohol concentration. When the purge of the vaporized fuel is cut during the estimation enabling period, the purge controller: performs control so that the purge is cut with a large degree of tailing, in an operation region where a load of the internal combustion engine is high and a rotation speed is high; and performs control so that the purge is cut with a smaller degree of tailing than the large degree of tailing, in an operation region where the load of the internal combustion engine is low and the rotation speed is low.

2 Claims, 5 Drawing Sheets

CONTROLLER OF INTERNAL COMBUSTION ENGINE

BACKGROUND OF THE INVENTION

The present invention relates to a controller of an internal combustion engine.

There is an FFV (Flexible Fuel Vehicle) as a vehicle that can run on blended fuels of various compositions of gasoline and alcohol. With an FFV, an alcohol concentration in a blended fuel is detected by an alcohol concentration sensor, and operation parameters, such as a fuel injection amount of an engine, are controlled according to the detected alcohol concentration.

There is a related-art fuel property estimating device, with which, from an aspect of cost reduction, etc., an alcohol concentration sensor is not disposed, and the alcohol concentration is estimated from a detection value of an $O_2$ sensor or other already-present sensor. For example, there is a related-art fuel property estimating device that estimates the alcohol concentration based on a feedback correction amount, determined from an exhaust air-fuel ratio detected by an $O_2$ sensor, etc., only in a predetermined time in which predetermined enabling conditions are met (the conditions that fuel supplying has been performed and a cumulative fuel consumption amount after fuel supplying is no more than a fixed amount) (see JP-A-2004-251135 (Claim 1, FIG. 1, etc.)). This fuel property estimating device includes a plurality of concentration estimation enabling units, respectively corresponding to a plurality of disturbance factors influencing the exhaust air-fuel ratio, and is configured so that when a disturbance factor occurs, an enabling condition is not met at the corresponding concentration estimation enabling unit, corresponding to the disturbance factor that occurred, and estimation of concentration of a single component in a fuel is disabled. With this device, because the concentration estimation can be performed after the disturbance factor is eliminated, an estimated value can be improved in precision.

A purged fuel correction amount shall now be described. With a fuel controlling system of an engine, a purged fuel correction amount is set to compensate for an influence of purged vaporized fuel. A deviation of a feedback correction amount from a reference value during purging is deemed to be a contribution due to vaporized fuel and the purged fuel correction amount is determined based on this deviation. The purged fuel correction amount is reflected in feedback control only during purging. When the purge is cut, the purged fuel correction amount is decreased progressively in accordance with a degree of decrease in purging. In this case, if there is no change in fuel properties, because the feedback correction amount is a value (close to the reference value) from which the influence of the purged vaporized fuel is eliminated, the air-fuel ratio can be controlled with stability both during the vaporized fuel purge (that is, when the feedback correction amount and the purged fuel correction amount are used) and during the purge cut (that is, when just the feedback correction amount is used).

With an engine including a canister that stores vaporized fuel, the vaporized fuel is purged via a purge passage from the canister to an air intake system. The purged vaporized fuel contributes to combustion in a combustion chamber as a portion of the fuel and becomes a disturbance factor with respect to the correction amount of feedback control based on the exhaust air-fuel ratio. Thus, in a case where the alcohol concentration is estimated based on the feedback correction amount determined from the exhaust air-fuel ratio, even in a concentration estimation enabling period, in which concentration estimation enabling conditions are met, estimation of the alcohol concentration is disabled during the vaporized fuel purge. There is thus present in the concentration estimation enabling period, a concentration estimation executing period, in which estimation of the alcohol concentration is performed only when purging is cut and feedback control is operating.

On the other hand, during a period in which the vaporized fuel purge is performed, the estimation of the alcohol concentration is disabled and renewal of the estimated value is not performed because the period falls outside the concentration estimation executing period, the alcohol concentration may be changing greatly in actuality. In this case, when the vaporized fuel being purged is cut and the concentration estimation executing period is started, because renewal of the estimated value has not been performed at a point immediately after starting, feedback control is performed at a control amount (fuel injection amount) that is in accordance with the alcohol concentration estimated in a previous concentration estimation executing period. In this case, because the change of the alcohol concentration is reflected in the purged fuel correction amount but not reflected in the feedback correction amount, the alcohol concentration change amount (difference between the actual alcohol concentration and the alcohol concentration estimated in the previous concentration estimation executing period) is not reflected in the fuel injection amount immediately after the starting of the concentration estimation executing period accompanying the purge cut and an air-fuel ratio error occurs.

In particular, when the vaporized fuel purge is cut instantaneously, the air-fuel ratio changes rapidly in accompaniment. Although the changed air-fuel ratio must be converged quickly to a desired air-fuel ratio, the fuel injection amount for this can only be feedback corrected by a gain that is normally set for feedback control. It thus takes time to achieve convergence to the desired air-fuel ratio.

SUMMARY

It is therefore an object of the invention to provide a controller of an internal combustion engine which, even when an alcohol concentration in a fuel changes greatly during purging of vaporized fuel, can suppress a change of air-fuel ratio after a purge cut to enable the air-fuel ratio to converge to a desired air-fuel ratio in a short time.

In order to achieve the object, according to the invention, there is provided a controller of an internal combustion engine that can use a blended fuel with alcohol blended therein, the controller comprising:

a purge controller, operable to control opening and closing of a purge passage that connects a canister, storing a vaporized fuel, and an air intake system of the internal combustion engine, to control a purge amount of the vaporized fuel purged to the air intake system;

an exhaust air-fuel ratio detector, operable to detect an exhaust air-fuel ratio of the internal combustion engine;

an air-fuel ratio feedback controller, operable to perform feedback control of the internal combustion engine so as to make the exhaust air-fuel ratio, detected by the exhaust air-fuel ratio detector, approach a target air-fuel ratio;

a period determiner, operable to determine whether it is an estimation enabling period, in which estimation of an alcohol concentration in the blended fuel is enabled, when a condition is met; and an alcohol concentration estimator, operable to estimate the alcohol concentration of the blended fuel based on the exhaust air-fuel ratio, detected by the exhaust air-fuel ratio detector, when the period determiner determines that it is the estimating enabling period, the air-fuel ratio feedback controller is in operation, and purge of the vaporized fuel is cut by the purge controller, wherein when the purge of the vaporized fuel is cut during the estimation enabling period, the purge controller:

performs control so that the purge is cut with a large degree of tailing, in an operation region where a load of the internal combustion engine is high and a rotation speed is high; and performs control so that the purge is cut with a smaller degree of tailing than the large degree of tailing, in an operation region where the load of the internal combustion engine is low and the rotation speed is low.

The alcohol concentration estimator may start to estimate the alcohol concentration after elapse of a time period from a time when the purge of the vaporized fuel is cut.

DETAILED DESCRIPTION OF PREFERRED EMBODIMENTS

Figure 1:
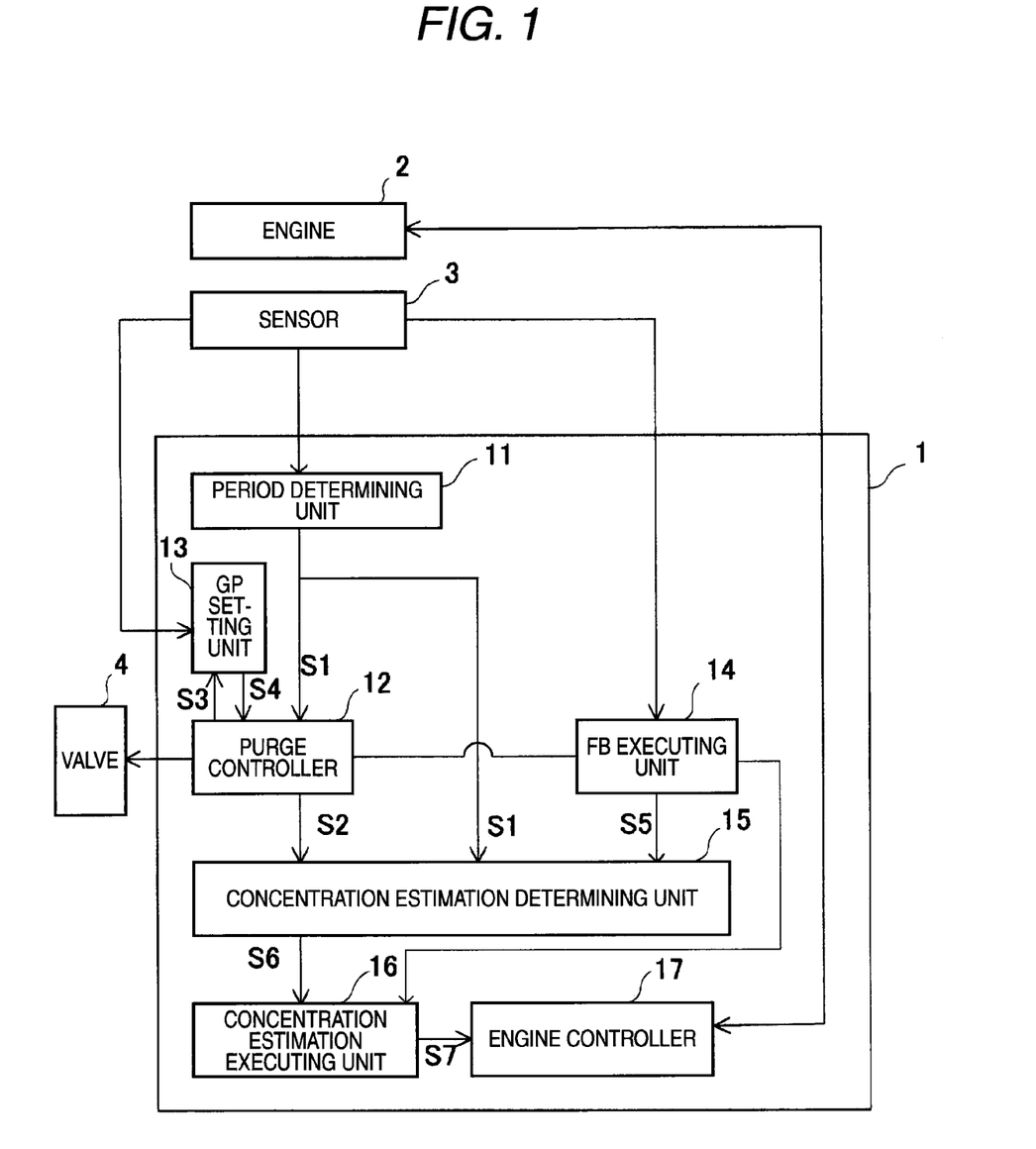
FIG. 1 is a block diagram for describing a configuration of an internal combustion engine controller according to the present invention.

An embodiment of an internal combustion engine controller according to the present invention shall now be described based on FIG. 1. FIG. 1 is a block diagram for describing a configuration of the embodiment.

As shown in FIG. 1, a controller 1 is connected to an engine 2 and a sensor 3.

The engine 2 is operable with a blended fuel, in which alcohol is blended, and based on signals from the controller 1, a fuel injection amount and an injection timing are controlled according to an operation state. The operation state is determined by detection by the sensor 3. As the blended fuel, there is, for example, a blended fuel, composed of 15% gasoline and 85% alcohol (ethanol), that is presently available for fuel supplying commercially.

The sensor 3 refers to various sensors, such as a sensor detecting an engine rotation speed, a sensor detecting a water temperature of the engine, an $O_2$ sensor, which is an exhaust air-fuel ratio detector, a fuel sensor for fuel supplying, that are installed in a vehicle and is represented by the single sensor 3 simply for the sake of convenience. The controller 1 estimates an alcohol concentration based on various detection amounts from the sensor 3 even when fuels differing in alcohol concentration are supplied and sets the fuel injection amount and the fuel injection timing to make an exhaust air-fuel ratio equal to a predetermined air-fuel ratio in accordance with the estimated alcohol concentration.

The controller 1 is connected to a purge solenoid valve (also referred to hereinafter simply as "valve") 4, installed in a purge passage, disposed between an unillustrated canister, storing vaporized fuel, and an air intake system of the engine. Vaporized fuel is purged from the canister to the air intake system of the engine via the purge passage.

Figure 2:
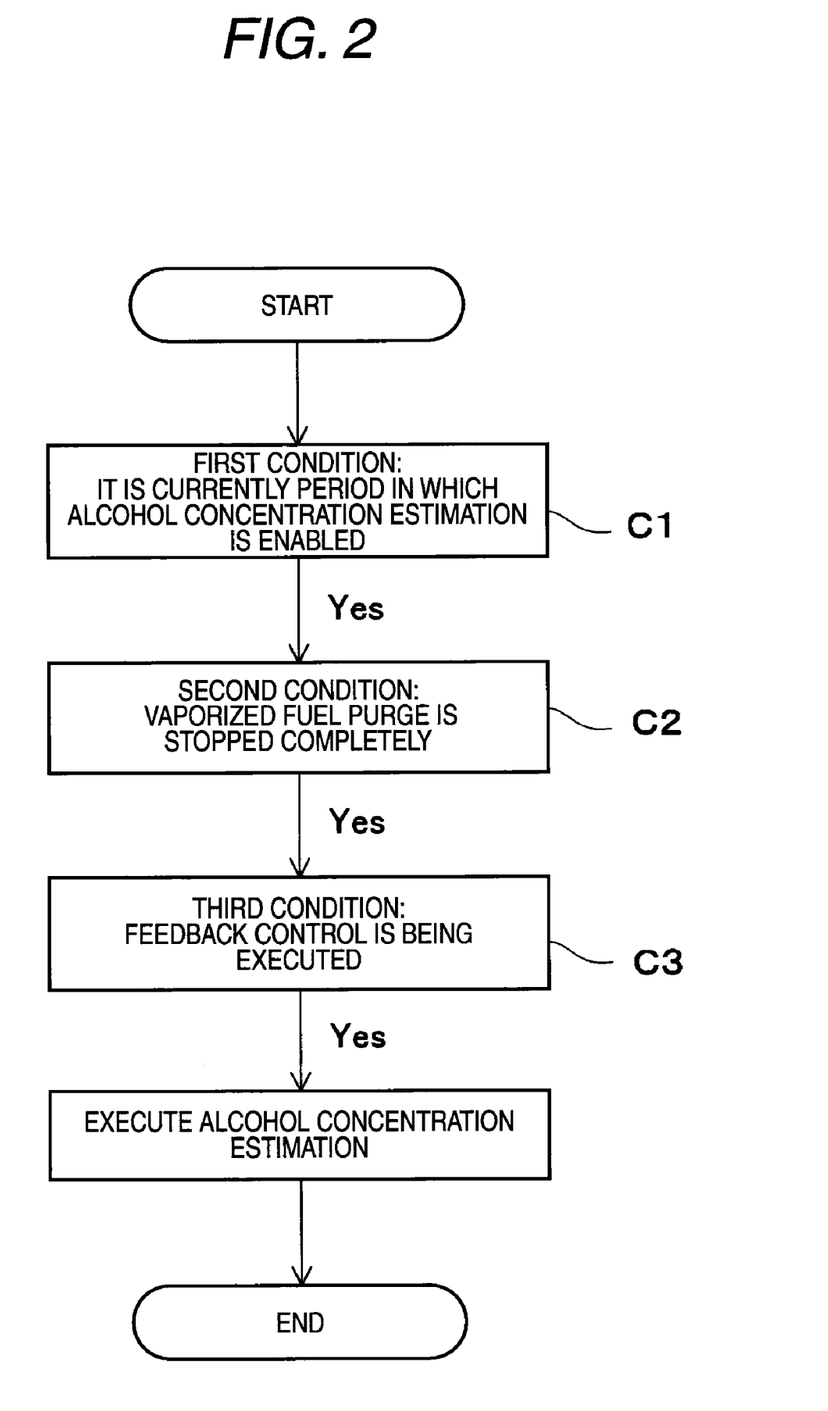
FIG. 2 is a diagram for describing starting conditions for performing alcohol concentration estimation.

In which cases the alcohol concentration is estimated with the controller 1 shall now be described based on FIG. 2. FIG. 2 is a flowchart for describing, in a simple manner, starting conditions for performing the alcohol concentration estimation in the controller.

As a first condition, a condition that it must currently be an alcohol concentration estimation enabling period in which conditions for performing alcohol concentration estimation are indicated (C1) can be cited. That is, the conditions that fuel supplying of an alcohol fuel, which is a fuel that contains alcohol, has been performed and that a cumulative fuel consumption amount of the internal combustion engine after fuel supplying is no more than a predetermined amount must be met. This is because if these conditions are not met, there is no need to perform the alcohol concentration estimation.

As a second condition, a condition that the vaporized fuel purge is stopped completely (C2) can be cited. This is because with the alcohol concentration estimation, if the purge is not stopped completely, the purge, which is a disturbance in computing the correction amount of feedback to the combustion chamber, is introduced and an accurate estimation of the alcohol concentration cannot be performed. Although here, that the purge is stopped completely refers to a case where a duty of the purge solenoid is 0, a case where the duty is substantially 0 is also included.

As a third condition, that feedback control is being performed (C3) is cited as a condition. This is because the alcohol concentration estimation is performed based on the feedback correction amount.

The alcohol concentration estimation is performed when these three conditions are met.

Returning now to FIG. 1, the configuration of the controller 1 that performs the alcohol concentration estimation when the conditions C1 to C3 are met shall be described specifically. The controller 1 includes a period determining unit 11, determining whether or not it is currently a period in which the alcohol concentration estimation is enabled (condition C1), a purge controller 12, controlling the purge/purge cut (stoppage) of vaporized fuel, a Gp setting unit 13, setting a tailing gain (degree of tailing; also referred to hereinafter simply as "Gp") for the purge cut, and an FB executing unit 14, performing feedback control of the air-fuel ratio. Furthermore in the controller 1, a concentration estimation determining unit 15, determining whether or not the alcohol concentration estimation enabling conditions C1 to C3 are met, and a concentration estimation executing unit 16, executing the alcohol concentration estimation, and an engine controller 17, connected to the engine 2 and performing engine control, are connected. Hereinafter, a detailed description shall be provided.

The period determining unit 11 is connected to the sensor 3 and is enabled to determine, from outputs of the sensor 3, whether or not it is currently the period in which the alcohol concentration estimation is enabled, that is, whether or not the condition C1 is met. Specifically, it is determined from signals input from the sensor 3 whether or not the two conditions that fuel supplying has been performed and the fuel consumption amount is no more than the predetermined amount are met, and consequently, a C1 determination signal S1, indicating whether or not the condition C1 is met, is output. The output C1 determination signal S1 is input into the purge controller 12 and the concentration estimation determining unit 15.

The purge controller 12 is connected to the valve 4 and computes the purge solenoid duty (also referred to hereinafter simply as "duty") for adjusting an opening of the valve 4 in accordance with a purge/purge cut timing, set based on the C1 determination signal S1, and is enabled to control the purge/purge cut of the vaporized fuel by opening/closing the valve 4 based on the duty. The purge controller 12 sends, to the concentration estimation determining unit 15, a C2 determination signal S2 indicating whether or not the purge is completely stopped according to whether or not the duty is 0, in other words, indicating whether or not the condition C2 is met.

Here, the purge controller 12 does not stop the purge completely by setting the duty instantaneously to 0 but stops the purge by progressively decreasing the duty by applying tailing and thereby progressively decreasing the vaporized fuel purge amount. This is because by applying the tailing, even when the alcohol concentration in the fuel changes greatly during the vaporized fuel purge, a change of the air-fuel ratio during the purge cut can be suppressed to enable the air-fuel ratio to be converged to a desired air-fuel ratio in a short time. To set the tailing gain during the purge cut, the purge controller 12 sends, based on a timing of the purge cut, a Gp setting signal S3 to the Gp setting unit 13 for setting the Gp.

Also a purged fuel correction amount, for compensating for an influence of the purged vaporized fuel, can be set at the purge controller 12. The purge controller 12 of the present embodiment deems a deviation of the feedback correction amount from a reference value during the purge to be a contribution due to the vaporized fuel and determines the purged fuel correction amount based on this deviation. The purged fuel correction amount is reflected in the feedback control only during the purge, and when the purge is cut, the purged fuel correction amount is decreased progressively in accordance with a degree of decrease in the purge. Here, if there is no change in fuel properties, because the feedback correction amount is a value from which the influence of the purged vaporized fuel is eliminated (a value close to the reference value), the air-fuel ratio can be controlled with stability both during the vaporized fuel purge (that is, when the feedback correction amount and the purged fuel correction amount are used) and during the purge cut (that is, when just the feedback correction amount is used).

The Gp setting unit 13 sets the Gp according to the Gp setting signal S3 sent from the purge controller 12, and sends a Gp signal S4, indicating the set Gp, to the purge controller 12.

The Gp setting unit 13 is connected to the sensor 13, and when the Gp setting signal S3 is input, operation condition signals, indicating detected states of engine load and engine rotation speed, are input from the sensor 3. The Gp setting unit 13 sets the Gp by referencing a tailing gain map, shown in FIG. 3, according to the operation condition signals. With the tailing gain map of FIG. 3, an ordinate indicates the engine load, an abscissa indicates the engine rotation speed, and tailing gains are set in advance according to operation conditions that are sectioned based on numerical values of these parameters. In the figure, as an example, the Gp setting unit 13 has the operation conditions sectioned into the nine operation condition regions of Zone 0 to Zone 8, a Gp is set in advance for each operation condition region, and the Gp setting unit 13 determines, from the operation condition signals, which operation condition region is currently entered and is enabled to obtain the Gp value of the corresponding operation condition region.

Figure 3:
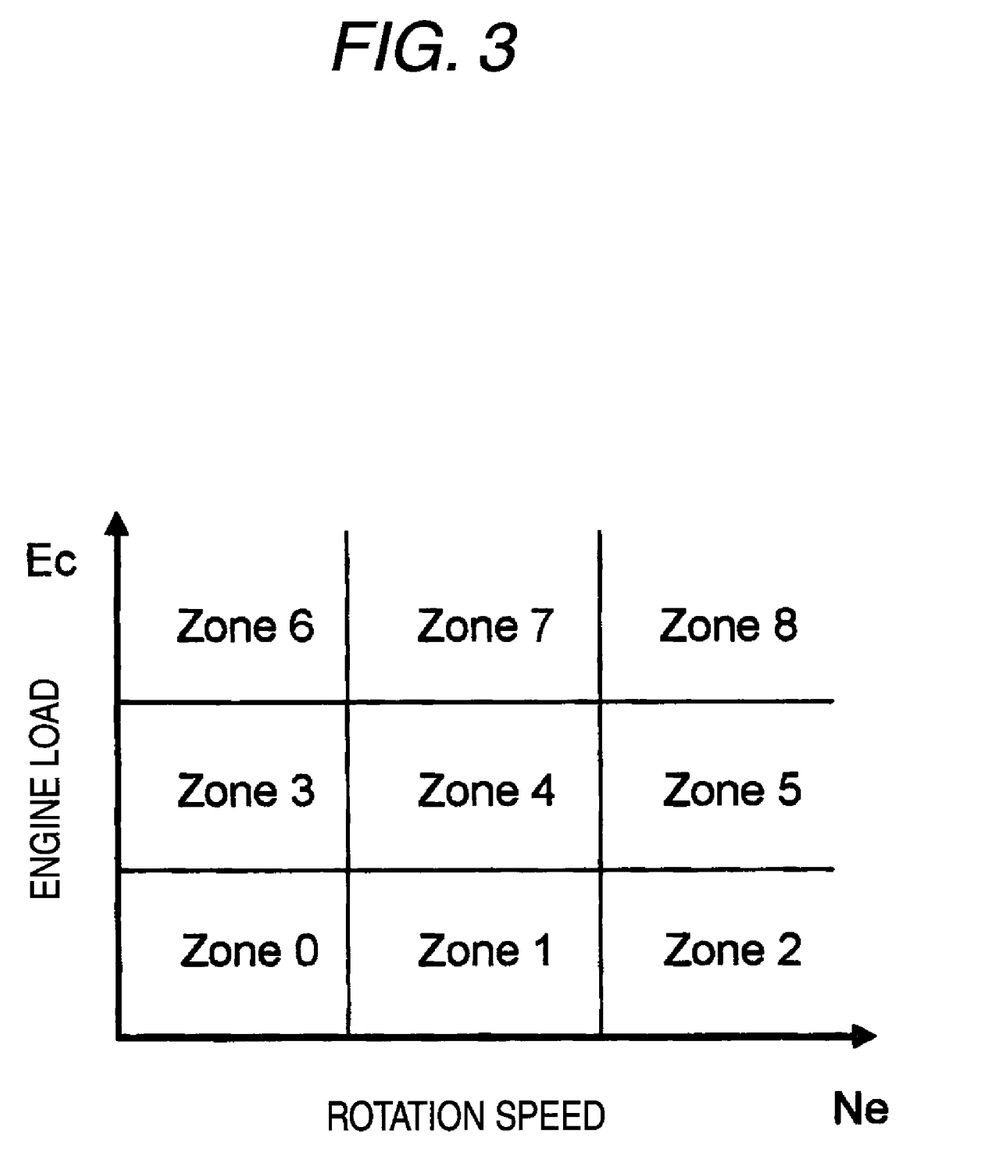
FIG. 3 is a block diagram for describing a tailing gain map.

With the tailing gain map shown in FIG. 3, a small Gp is set in a low-speed, low-load region (in particular, an idling state) of low feedback gain, and a large Gp is set in a high-speed, high-load region of high feedback gain. A large Gp is set in a high-speed, high-load region of high feedback gain because the feedback correction value follows an alcohol concentration change readily in such a region, and a Gp smaller than the Gp in a high-speed, high-load region is set in a low-speed, low-load region of low feedback gain because the feedback correction value does not follow an alcohol concentration change readily in such a region.

The FB executing unit 14 is connected to the sensor 3 and is enabled to perform control to make the air-fuel ratio of the internal combustion engine approach the desired target air-fuel ratio based on an exhaust air-fuel ratio signal from the sensor 3 and perform air-fuel ratio control based on the feedback gain in accordance with the operation state of the internal combustion engine. The FB executing unit 14 outputs, to the concentration estimation determining unit 15, a C3 determination signal S5, indicating whether or not a current state is an operating state in which feedback control is performed, in other words, indicating whether or not the condition C3 is met. The FB executing unit 14 also outputs the computed feedback correction value to the concentration estimation executing unit 16.

The concentration estimation executing unit 15 determines whether or not all of the predetermined conditions C1 to C3 for performing alcohol concentration determination are met, and the C1 determination signal S1 from the period determining unit 11 indicating whether or not it is currently the estimation enabling period, the C2 determination signal S2 from the purge controller 12 indicating whether or not the purge has been stopped completely, and the C3 determination signal S5 from the FB executing unit 14 indicating whether feedback is being executed, are input therein.

The concentration estimation determining unit 15 determines that all of the predetermined conditions C1 to C3 for performing the alcohol concentration determination are met when the C1 determination signal S1 indicating that it is currently the estimation enabling period, the C2 determination signal S2 indicating that the purge has been stopped completely, and the C3 determination signal S5 indicating that feedback is being executed are input, and after elapse of a predetermined time from complete stoppage of purge, the concentration estimation determining unit 15 sends a concentration estimation execution signal S6, indicating execution of the concentration estimation, to the concentration estimation executing unit 16.

The concentration estimation executing unit 16 performs, upon input of the concentration estimation execution signal S6, referencing of the feedback correction value input from the FB executing unit 14 and execution of the alcohol concentration estimation. When the alcohol concentration estimation has been executed, the concentration estimation executing unit 16 sends an alcohol concentration value signal S7, indicating the estimated alcohol concentration, to the engine controller 17.

The engine controller 17 sets an injection amount based on engine state signals from the sensor 3 that indicate states of the engine 2 and the alcohol concentration value signal S7, indicating the alcohol concentration value, and controls the engine 2 based on the injection amount. When the alcohol concentration value signal is not input, the engine controller 17 controls the engine 2 based on a previously input alcohol concentration value signal and the engine state signals.

With the controller 1, by connection of the Gp setting unit 13, setting the Gp and sending the Gp to the purge controller 12, the purge can be made to be stopped, not instantaneously completely, but by progressive decrease by application of tailing. Because the vaporized fuel purge amount and the purged fuel correction amount are consequently decreased progressively and the change of alcohol concentration is reflected gradually in the feedback correction value, the A/F can be suppressed from changing rapidly and can be made to converge to the desired air-fuel ratio in a short time. Furthermore in this case, by setting the Gp according to the operation conditions, further suppression of rapid change of the A/F can be achieved.

Figure 4:
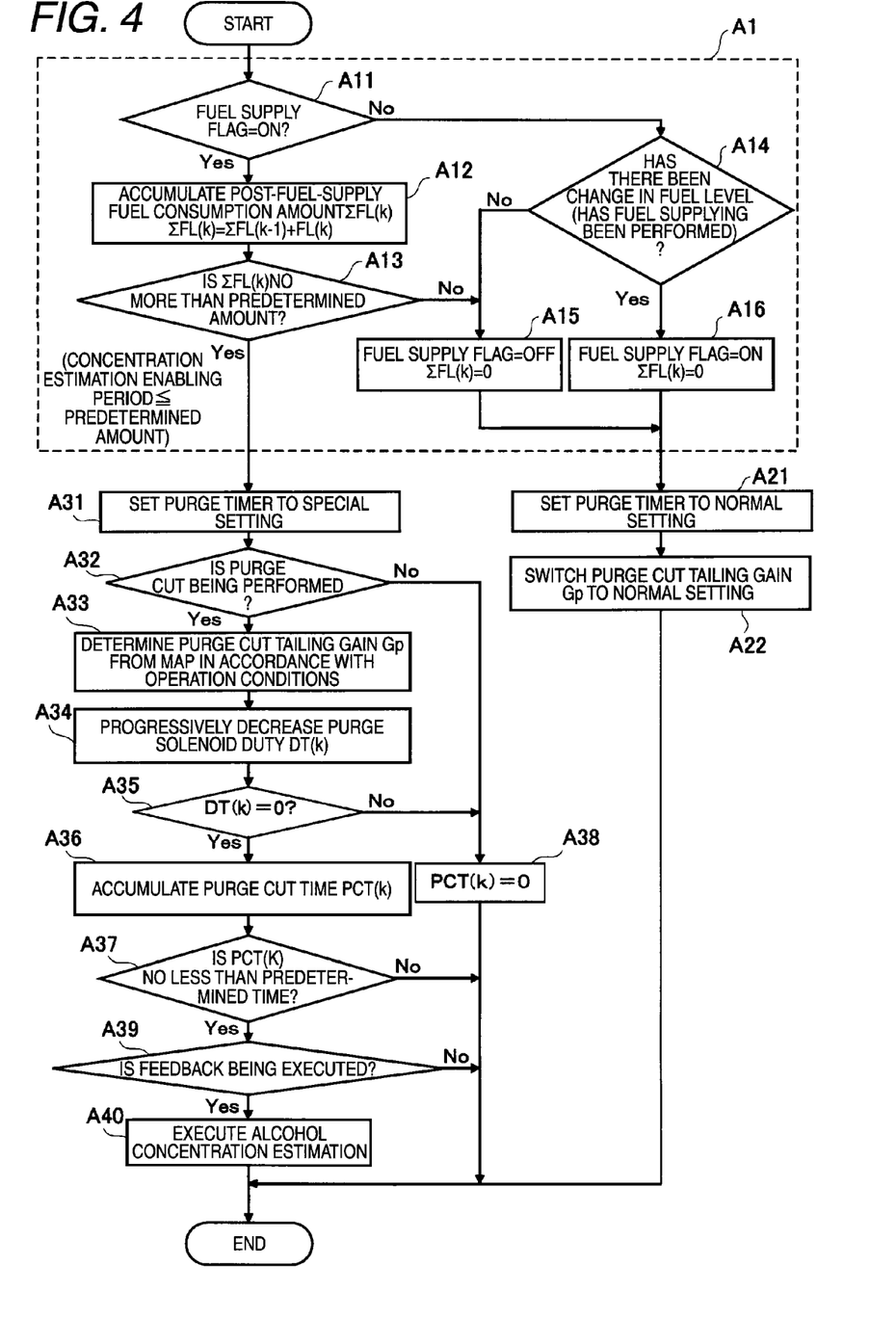
FIG. 4 is a flowchart for describing an internal combustion engine controlling method according to the present invention.

A method for controlling the engine using the controller 1 shown in FIG. 1 shall now be described with reference to FIG. 4. FIG. 4 is a flowchart for describing the control method at a certain time (k).

First, in step A1, it is determined in the period determining unit 11 whether or not a signal of a fuel supply flag inside the controller 1 is a signal indicating ON. If the signal indicates ON (A11; YES), step A12 is entered. In step A12, it is deemed that fuel supplying has been performed and it is then determined whether or not a cumulative fuel consumption amount condition is met. That is, the cumulative fuel consumption amount after fuel supplying is computed based on the fuel injection amount from an injector (not shown), and then in step A13, it is determined whether or not the cumulative fuel consumption amount after fuel supplying is no more than the predetermined amount. If the cumulative fuel consumption amount is no more than the predetermined amount (A13; YES), it is currently the alcohol concentration estimation enabling period and because the first condition C1 shown in FIG. 2 is thus met, the C1 determination signal S1, indicating that the condition C1 is met, is sent from the period determining unit 11 and step A31, to be described below, is entered.

On the other hand, if in step A11, the signal from the fuel supply flag is a signal indicating OFF (A11; NO), step A14 is entered. In step A14, it is determined whether or not fuel has been supplied according to whether or not there is a change in fuel level. If there is no change in fuel level (A14; NO), step A15 is entered. In step A15, the fuel supply flag is set to OFF and the fuel consumption amount is set to 0. Step A15 is also entered when it is determined in step A13 that the cumulative fuel consumption amount is no more than the predetermined amount. On the other hand, if there is a change in fuel level, step A16 is entered. In step A16, the fuel supply flag is set to ON and the fuel consumption amount is set to 0. In a case where step A16 is entered, a signal indicating that the certain time (k) is not the alcohol concentration estimation enabling period is sent from the period determining unit 11 and step A21 is entered.

In step A21, the C1 determination signal S1, indicating that the condition C1 is not met is input into the purge controller 12, and a timer, determining a timing of purge/purge cut, is set to a normal setting. Thereafter, in step A22, the purge controller 12 outputs, based on the normal setting timing, the Gp setting signal S3, for setting the normal Gp, to the Gp setting unit 13, the normal Gp is set by the Gp setting unit 13, and the present control at the time (k) ends.

On the other hand, if it is currently the alcohol concentration estimation enabling period (A13: YES), the first condition C1 shown in FIG. 2 is met and step A31 is entered. In step A31, the C1 determination signal S1, indicating that the condition C1 is met, is input into the purge controller 12, and the timer, determining the timing of purge/purge cut, is set to a special setting for the concentration estimation enabling period. With this special setting, a purge stopping time is set longer than with the normal setting and occasions for alcohol concentration estimation are increased. Purge and purge cut in the concentration estimation enabling period are subsequently performed at this set timing.

Then, in step A32, it is determined at the purge controller 12 whether or not the purge is being cut according to the set timer. Here, if the purge is not being cut, because the condition C2 that the purge at time (k) is completely stopped is not met, the present control at the time (k) is ended.

If the purge is being cut (A32: YES), step A33 is entered. In step A33, the Gp setting signal S3 is input into the Gp setting unit 13, and the operation condition signals, indicating the operation conditions, are input from the sensor 3 into the Gp setting unit 13. Based on the operation condition signals, the Gp setting unit 13 references the tailing gain map, shown in FIG. 3, and determines the Gp that is in accordance with the operation condition signals. The Gp setting unit 13 then outputs the Gp signal S4, indicating the set Gp, to the purge controller 12.

Then, in step A34, the purge controller 12 computes, in accordance with the Gp signal S4, the duty by which the purge controller 12 adjusts the opening of the valve 4. Here, the duty $DT(k)$ at the time (k) is computed as: $DT(k)=DT(k-1)-Gp$.

Thus, with the control method according to the present invention, by setting the Gp in accordance with the operation conditions and progressively decreasing the vaporized fuel purge amount by progressively decreasing the duty based on the Gp, the change of the air-fuel ratio after the purge cut can be suppressed and the air-fuel ratio can be made to converge to the desired air-fuel ratio in a short time even when the alcohol concentration in the fuel changes greatly.

Then, in step A35, it is determined whether or not the duty value at the purge controller 12 is 0, that is, whether or not the second condition C2 of whether or not the purge is completely stopped is met.

If the duty is 0 (A35; YES), the second condition C2 shown in FIG. 2 is met and step A36 is entered. In step A36, the C2 determination signal S2, indicating that the second condition C2 is met, is output to the concentration estimation determining unit 15, and in the concentration estimation determining unit 15, in order to make the concentration estimation be executed after the elapse of the predetermined time from the complete stoppage of the purge, a purge cut cumulative time from the point at which the duty becomes 0 is computed. Specifically, the purge cut cumulative time $PCT(k)$ at the certain time (k) is computed by adding a computation cycle time to the purge cut cumulative time $PCT(k-1)$ to a certain time $(k-1)$.

Then, in step A37, it is determined whether or not the purge cut cumulative time has exceeded the predetermined time. Here, whether or not the purge cut cumulative time $PCT(k)$ has exceeded the predetermined time, that is, whether or not the predetermined time has elapsed from the complete stoppage of the purge is determined in step A36 and step A37 by the following reason. That is, when the purge is stopped completely, the exhaust air-fuel ratio changes and there is a delay until this change is reflected in the feedback correction amount, and by setting such a delay time, the alcohol concentration estimation can be executed accurately after the predetermined time has elapsed and the change is reflected in the feedback correction amount.

On the other hand, if the duty is not 0 (A35; NO), step A38 is entered, and in step A38, the C2 determination signal S2, indicating that the second condition C2 is not met, is output to the concentration estimation determining unit 15, and at the concentration estimation determining unit 15, because the purge is not completely stopped, the purge cut cumulative time is set to 0. Thereafter, the present control is ended due to the second condition C2 shown in FIG. 2 not being met.

Returning to step A37, if the purge cut cumulative time exceeds the predetermined time in step A37, step S39 is entered. In step A39, it is determined whether or not feedback control is being executed by the FB executing unit 14.

If the feedback control is currently being executed (A39: YES), the third condition C3, shown in FIG. 3 is met, and step A40 is entered. In step A40, the C3 determination signal S5, indicating that feedback is being executed, that is, the third condition C3 is met, is input into the concentration estimation determining unit 15, and the concentration estimation determining unit 15 determines that all of the alcohol concentration estimation enabling conditions for performing the alcohol concentration determination are met and sends the concentration estimation execution signal S6, indicating execution of the concentration estimation. The concentration estimation executing unit 16 executes the estimation of the alcohol concentration based on the concentration estimation execution signal S6.

If the feedback control is not being executed (A39: NO), because the third condition C3, shown in FIG. 3, is not met, the present control at the time (k) is ended.

Based on the alcohol concentration computed via the respective steps described above, the engine injection amount is reset by the engine controller 17.

With the present control method, when the purge cut is performed, the purge is not stopped completely instantaneously but can be decreased progressively by applying tailing. Because the vaporized fuel purge amount and the purged fuel correction amount are consequently decreased progressively and a change of the alcohol concentration is reflected gradually in the feedback correction amount, the A/F can be suppressed from changing rapidly and can be made to converge to the desired air-fuel ratio in a short time. Furthermore in this case, by the Gp being set from the tailing gain map in accordance with the operation conditions in the Gp setting step of setting the Gp, further suppression of rapid change of the A/F can be achieved.

Figure 5A:
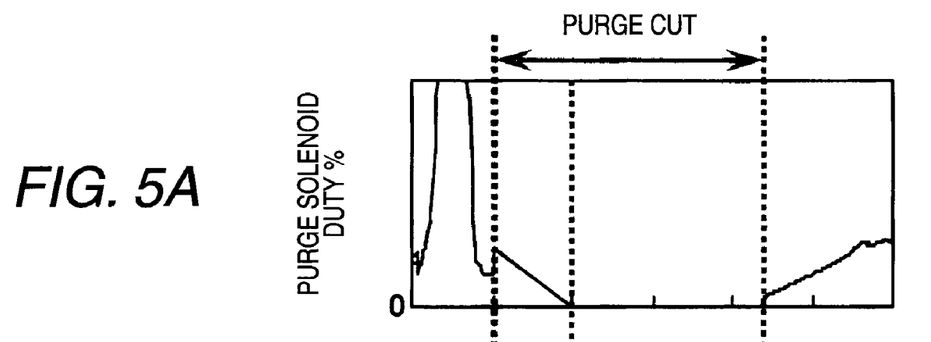
FIGS. 5A, 5B, 5C and 5D show graphs for describing a case where the internal combustion engine controller according to the present invention is made to operate.
Figure 5B:
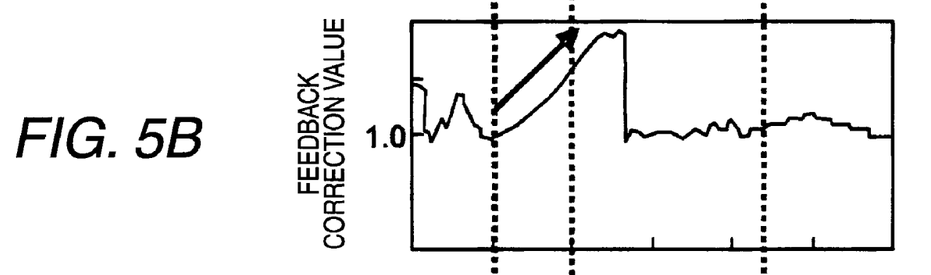
Figure 5C:
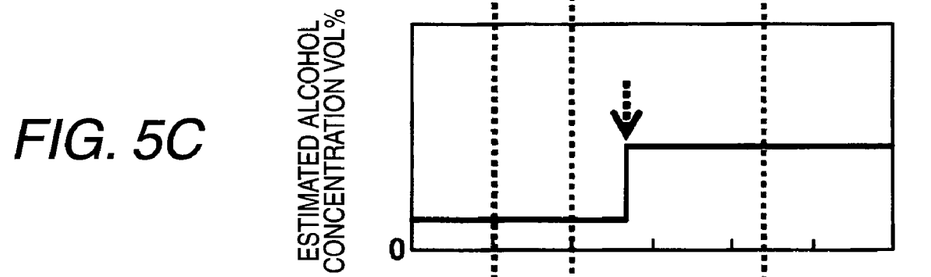
Figure 5D:
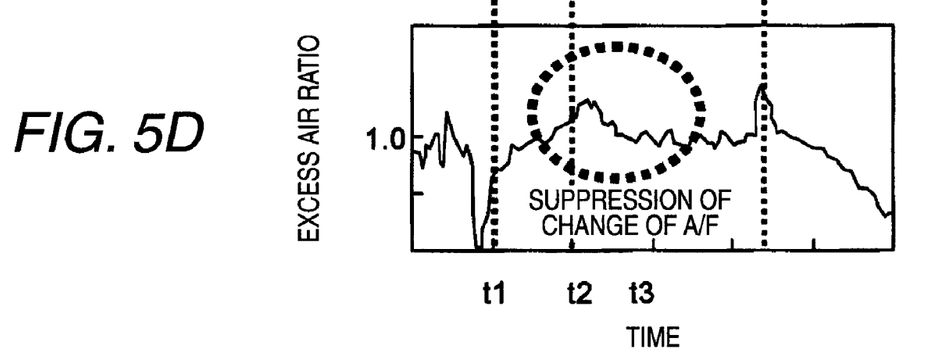

A behavior of the A/F during purge cut shall now be described based on FIG. 5. FIG. 5A is a graph of a change of the purge solenoid duty value with an elapse of time, FIG. 5B is a graph of a change of the feedback correction value with the elapse of time, FIG. 5C is a graph of a change of the estimated alcohol concentration value with the elapse of time, and FIG. 5D is a graph of a change of an excess air ratio with the elapse of time.

According to FIG. 5A, the purge cut is started at t=t1. During the purge cut, the duty is progressively decreased by the purge controller 12 based on the Gp set by the Gp setting unit 13. By the progressive decrease in the duty, the vaporized fuel purge amount is decreased progressively, the alcohol concentration change is thus reflected gradually in the feedback correction value, and the feedback correction value changes progressively based on the feedback gain (FIG. 5B). Then, at t=t2, the purge stops completely, and it is determined at the concentration estimation determining unit 15 that all of the conditions C1 to C3 for executing the alcohol concentration estimation are met. Then, after the elapse of the delay time, the estimated alcohol concentration is renewed at t=t3 (FIG. 5C). In this case, near t=t2, the excess air ratio converges substantially to 1 without hardly causing any change in the A/F.

Thus, with the present control method, because by gradually decreasing the duty value, the feedback correction value can be made to follow the duty, the estimated alcohol concentration can be renewed quickly after purge cut, the change of the A/F can be suppressed, and the A/F can be made to converge to the desired air-fuel ratio in a short time. Furthermore, because by performing the alcohol concentration estimation upon setting the delay time, the concentration estimation can be performed after the change is reflected in the feedback correction amount, the alcohol concentration estimation can be executed more accurately.

According to an aspect of the invention, the purge controller controls the opening/closing of the purge passage to control the purge amount of the vaporized fuel, flowing in the purge passage. When purging of the vaporized fuel is cut during the estimation enabling period, by the purging of the vaporized fuel being cut with the degree of tailing being changed according to the operation region, the purge amount and the purged fuel correction amount are decreased progressively and the change of the alcohol concentration is reflected gradually in the feedback correction amount, thereby suppressing rapid change of the A/F and enabling feedback to convergence to the desired air-fuel ratio to be executed in a short period.

When the vaporized fuel purge is cut and the exhaust air-fuel ratio changes, there is a delay until this change is reflected in the feedback correction amount. With the present invention, by performing the alcohol concentration estimation under the condition of elapse of the predetermined time, the alcohol concentration estimation can be performed when the predetermined time elapses after the cutting of the vaporized fuel purge and the change is reflected in the air-fuel ratio feedback correction amount, thereby enabling the alcohol concentration to be estimated more accurately.

According to an aspect of the invention, even when an alcohol concentration in a fuel changes greatly during a vaporized fuel purge, a change of air-fuel ratio after a purge cut can be suppressed to enable the air-fuel ratio to converge to a desired air-fuel ratio in a short time.

The internal combustion engine controller according to the present invention can be used as a controller of an internal combustion engine, such as an engine of a vehicle. The present invention is thus applicable in a vehicle manufacturing industry.

What is claimed is:

1. A controller of an internal combustion engine that can use a blended fuel with alcohol blended therein, the controller comprising:

a purge controller, operable to control opening and closing of a purge passage that connects a canister, storing a vaporized fuel, and an air intake system of the internal combustion engine, to control a purge amount of the vaporized fuel purged to the air intake system;

an exhaust air-fuel ratio detector, operable to detect an exhaust air-fuel ratio of the internal combustion engine;

an air-fuel ratio feedback controller, operable to perform feedback control of the internal combustion engine so as to make the exhaust air-fuel ratio, detected by the exhaust air-fuel ratio detector, approach a target air-fuel ratio;

a period determiner, operable to determine whether it is an estimation enabling period, in which estimation of an alcohol concentration in the blended fuel is enabled, when a condition is met; and an alcohol concentration estimator, operable to estimate the alcohol concentration of the blended fuel based on the exhaust air-fuel ratio, detected by the exhaust air-fuel ratio detector, when the period determiner determines that it is the estimating enabling period, the air-fuel ratio feedback controller is in operation, and purge of the vaporized fuel is cut by the purge controller, wherein when the purge of the vaporized fuel is cut during the estimation enabling period, the purge controller:
 performs control so that the purge is cut with a large degree of tailing, in an operation region where a load of the internal combustion engine is high and a rotation speed is high; and
 performs control so that the purge is cut with a smaller degree of tailing than the large degree of tailing, in an operation region where the load of the internal combustion engine is low and the rotation speed is low.

2. The controller according to claim 1, wherein
 the alcohol concentration estimator starts to estimate the alcohol concentration after elapse of a time period from a time when the purge of the vaporized fuel is cut.

* * * * *